(12) United States Patent
Aubert et al.

(10) Patent No.: US 6,214,306 B1
(45) Date of Patent: *Apr. 10, 2001

(54) COMPOSITION BASED ON ZIRCONIUM OXIDE AND CERIUM OXIDE, PREPARATION METHOD THEREFOR AND USE THEREOF

(75) Inventors: Maryline Aubert, Angliers; Thierry Birchem, Paris; Gilbert Blanchard, Le Plessis-Belleville; Olivier Touret, La Rochelle, all of (FR)

(73) Assignee: Rhone-Poulenc Chimie, Courbevoie Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,871

(22) PCT Filed: Jun. 28, 1996

(86) PCT No.: PCT/FR96/01003

§ 371 Date: May 8, 1998

§ 102(e) Date: May 8, 1998

(87) PCT Pub. No.: WO97/02213

PCT Pub. Date: Jan. 23, 1997

(30) Foreign Application Priority Data

Jul. 3, 1995 (FR) .................................................. 95 07979

(51) Int. Cl.[7] .................................................... B01J 8/02
(52) U.S. Cl. ........................ 423/213.2; 423/212; 502/304; 502/349
(58) Field of Search ............................. 423/212, 213.2, 423/213.5, 608, 610; 502/300, 303, 304, 306, 349

(56) References Cited

U.S. PATENT DOCUMENTS

| | | | |
|---|---|---|---|
| 4,760,044 | * 7/1988 | Joy, III et al. | 502/303 |
| 4,977,129 | * 12/1990 | Ernest | 502/330 |
| 5,008,090 | * 4/1991 | Joy, III et al. | 423/212 |
| 5,015,617 | 5/1991 | Ohata et al. | 502/304 |
| 5,128,306 | * 7/1992 | Dettling et al. | 502/304 |
| 5,254,519 | * 10/1993 | Wan et al. | 502/252 |
| 5,492,878 | * 2/1996 | Fuji et al. | 502/304 |
| 5,626,826 | * 5/1997 | Chopin et al. | 423/213.2 |

FOREIGN PATENT DOCUMENTS

| | | |
|---|---|---|
| 605274 | 7/1994 | (EP) . |
| 629438 | 12/1994 | (EP) . |
| 2590887 | 5/1987 | (FR) . |
| 2701471 | 8/1994 | (FR) . |
| 9518068 | 7/1995 | (WO) . |

* cited by examiner

*Primary Examiner*—Tom Dunn
(74) *Attorney, Agent, or Firm*—Burns, Doane, Swecker & Mathis, L.L.P

(57) ABSTRACT

The invention relates to a composition based on zirconium oxide and comprising cerium oxide which has a specific surface of at least 30 $m^2/g$ after calcination for 6 hours at 900° C. and which is provided in the form of a pure solid solution of cerium oxide in zirconium oxide. According to another embodiment, this composition can additionally comprise a doping element and can exhibit a specific surface of at least 25 $m^2 g$ after calcination for 6 hours at 1000° C. A process for the preparation of these compositions comprises the following stages:

- a mixture is prepared, in liquid medium, containing a zirconium compound and a cerium(IV) compound;
- the said mixture is heated at a temperature greater than 100° C.;
- the reaction mixture obtained on conclusion of the heating is brought to a basic pH;
- the precipitate thus obtained is recovered;
- the said precipitate is calcined;

the doping element being, if appropriate, added either to the starting mixture in liquid medium or to the reaction mixture obtained on conclusion of the heating.

84 Claims, 1 Drawing Sheet

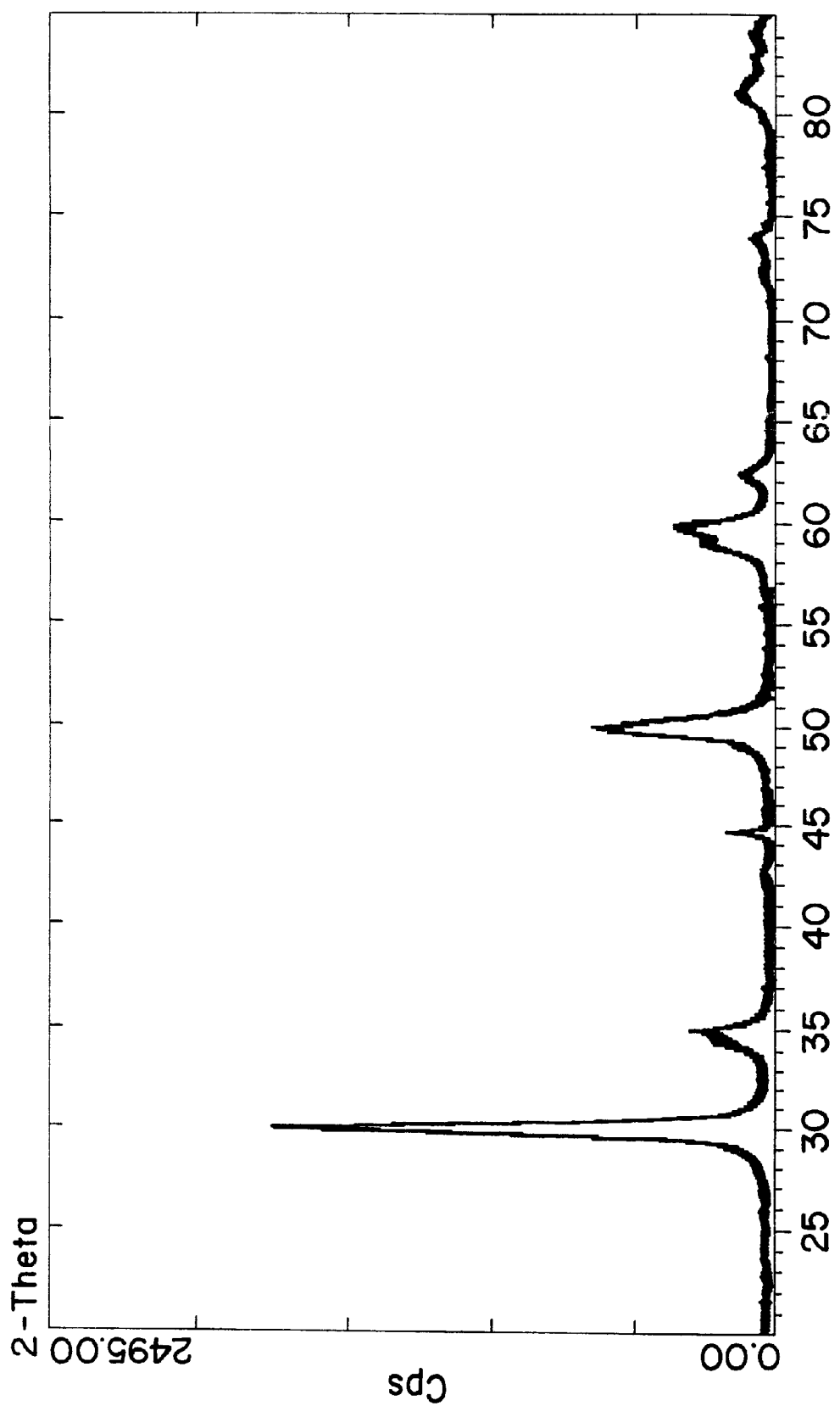

COMPOSITION BASED ON ZIRCONIUM OXIDE AND CERIUM OXIDE, PREPARATION METHOD THEREFOR AND USE THEREOF

The present invention relates to a composition based on zirconium oxide and on cerium oxide, to its processor or preparation and to its use, in particularly in catalysis.

So-called multifunctional catalysts are currently used in the treatment of exhaust gases from internal combustion engines (automobile afterburning catalysis). Multifunctional catalysts is understood to means catalysts capable of carrying out not only oxidation, in particular of carbon monoxide and hydrocarbons present in exhaust gases, but also reduction, in particularly of nitrogen oxides also present in these gases ("three-way" catalysts). Zirconium oxide and cerium oxide today appear as two particularly important and advantages constituents in this type of catalyst. To be effective, these catalysts must have a high specific surface, even at high temperature. Moreover, it is often advantages to use these catalysts in the form of mixed oxides or of solid solutions.

There therefore exists a need for catalysts capable of being able to be used at high temperature and, for this, exhibiting high stability with respect to their specific surface.

The subject of the invention is thus the development of a catalytic composition which can respond to this need.

Another object of the invention is to provide catalysts based on zirconium oxide and on cerium oxide and which are provided in the form of a solid solution.

With this aim, the composition of the invention is based on zirconium oxide and it comprises cerium oxide and it is characterized in that it has a specific surface of at least 30 $m^2/g$ after calcination for 6 hours at 900° C. and in that it is provided in the form of a pure solid solution of cerium oxide in zirconium oxide.

Moreover, according to another embodiment of the invention, the composition is based on zirconium oxide and it comprises cerium oxide and it is characterized in that it has a specific surface greater than 25 $m^2/g$ after calcination for 6 hours at 1000° C.

According to a third embodiment of the invention, the composition is based on zirconium oxide and it comprises cerium oxide and at least one doping element and it is characterized in that it has a specific surface of at least 25 $m^2/g$, more particularly of at least 30 $m^2/g$, after calcination for 6 hours at 1000° C.

The invention also relates to a process for the preparation of the above compositions which is characterized in that it comprises the following stages:

a mixture is prepared, in liquid medium, containing a zirconium compound and a cerium(IV) compound;

the said mixture is heated at a temperature greater than 100° C.;

the reaction mixture obtained on conclusion of the heating is brought to a basic pH;

the precipitate thus obtained is recovered;

the said precipitate is calcined;

the abovementioned doping element being, if appropriate, added either to the starting mixture in liquid medium or to the reaction mixture obtained on conclusion of the heating.

According to another alternative form of the invention, the preparation process is characterized in that it comprises the following stages:

a mixture is prepared, in liquid medium, containing a cerium compound and at least one zirconium oxychloride and, if appropriate, a compound of the doping element;

the said mixture and a basic compound are brought together, whereby the mixture is caused to precipitate;

the precipitate thus obtained is recovered;

the said precipitate is calcined.

Other characteristics, details and advantages of the invention will become still more completely apparent on reading the description which will follow and the appended drawing in which:

the single FIGURE is an X-ray diffraction spectrum of a composition of the invention.

The compositions of the invention are based on zirconium oxide. They additionally comprise cerium oxide.

As indicated above, the composition according to the first embodiment of the invention is characterized in that it has a specific surface of at least 30 $m^2/g$ after calcination for 6 hours at 900° C. and in that it is provided in the form of a pure solid solution of cerium oxide in zirconium oxide.

Specific surface of specific surface area is understood to mean, here and in the remainder of the description, the B.E.T. specific surface determined by nitrogen adsorption in accordance with the ASTM standard D 3663-78 laid down from the Brunauer-Emmett-Teller method described in the periodical "The Journal of the American Society, 60, 309 (1938)".

For this embodiment, the surface of the composition can be at least 40 $m^2/g$ after calcination for 6 hours at 900° C. Surfaces greater than 45 $m^2/g$ after calcination for 6 hours at 900° C. can even be obtained.

The other characteristic of the compositions according to this first embodiment is the fact that they are provided in the form of a pure solid solution of cerium oxide in zirconium oxide.

This is understood to means that the cerium is present entirely in solid solution in the zirconium. The X-ray diffraction spectra of these compositions reveal in particular, within the latter, the existance of a clearly identifiable single phase corresponding to that of a zirconium oxide crystallized in the cubic or quadratic system, thus reflecting the incorporation of the cerium within the crystal lattice of the zirconium oxide and thus the production of a true solid solution.

The compositions of the second embodiment exhibit, after calcination for 6 hours at 1000° C., a specific surface greater than 25 $m^2/g$. They can also, according to a specific alternative form, be provided in the form of a pure solid solution of cerium oxide in zirconium oxide.

According to a third embodiment of the invention, the composition additionally contains a doping element. This doping element can be chosen, alone or as a mixture, from rare-earth metals; alkaline-earth metals; aluminum; thorium; scandium; gallium; titanium; niobium; or tantalum.

Rare-earth metal is understood to mean the elements from the group composed of yttrium and the elements of the periodic classification with an atomic number of between 57 and 71 inclusive. Mention may more particularly be made of yttrium, lanthanum, neodymium, praseodymium, suropium and samarium.

Mentioned may more particularly be made, for the alkaline-earth metals, of magnesium, calcium and barium.

The compositions of this embodiment have a surface of at least 25 $m^2/g$ after calcination for 6 hours at 1000° C. This surface can more particularly be at least 30 $m^2/g$. In certain cases, this surface can reach at least 40 $m^2/g$ and exceed 45 $m^2/g$.

These same compositions can, moreover, have a specific surface of at least 50 $m^2g$, more particularly of at least 60 $m^2g$, after calcination for 6 hours at 900° C.

The compositions comprising a doping agent can also be provided in the form of a solid solution of cerium oxide and of the doping agent in zirconium oxide. The X-ray diffraction spectra of these compositions are of the same type as those described above.

In the case of the compositions comprising at least lanthanum as doping agent, these compositions can have a specific surface, after calcination for 6 hours at 1100° C., of at least 5 $m^2g$, more particularly of at least 10 $m^2g$.

Expressed in the form of oxides, here and throughout the description, except when otherwise indicated, the compositions according to the invention generally contain at least 40% by weight of zirconium and at most 60% by weight of cerium. More particularly, they can exhibit a Zr/Ce atomic ratio equal to or greater than 1, that is to say contents equal to or greater than 42% by weight of zirconium and equal to or less than 50% by weight of cerium. According to another embodiment, the compositions according to the invention contain at least 51% by weight of zirconium and at most 49% by weight of cerium. These proportions, according to still more specific embodiments of the invention, can be more precisely at least 55% by weight of zirconium and at most 45% by weight of cerium and, more particularly still, at least 65% by weight of zirconium and at most 35% by weight of cerium.

According to other embodiments of the invention, the cerium proportion can be at most 30% and more particularly at most 20%.

The minimum cerium content is preferably at least 1%, more particularly greater than 10% and more particularly still at least 15%.

When the compositions of the invention additionally contain a doping element, the content of this element, still expressed in oxide form, can be between 0.1 and 50% by weight, in particular between 0.1 and 45% by weight, more particularly between 0.1 and 20% by weight and preferably between 1 and 10% by weight, with respect to the whole of the composition.

Finally, it should be noted that the compositions of the invention can additionally comprise hafnium. Hafnium is an element present with zirconium in currently available zirconium sources. Depending on the nature of this source in particular, the hafnium content, expressed as oxide, can vary between 0.01 and 25% with respect to the whole of the composition.

The processes for the preparation of the compositions of the invention will now be described.

Two alternative forms of the process exist. The first alternative form relates to a thermohydrolysis process and the second alternative form relates to a coprecipitation process. The first alternative form will be described below.

According to this first alternative form, the first stage of the process consists in preparing a mixture, in liquid medium, of a zirconium compound and of a cerium(IV) compound and, if appropriate, of the doping element. The various compounds of the mixture are present in the stoichiometric proportions necessary for obtaining the desired final composition.

The liquid medium is generally water.

The compounds are preferably soluble compounds. This can be in particular zirconium and cerium salts.

The mixture can, without distinction, be obtained either from compounds initially in the solid state which will subsequently be introduced into a water vessel heel, for example, or alternatively directly from solutions of these compounds, followed by mixing the said solution in any order.

The zirconium compounds can be chosen from zirconium sulphate, zirconyl nitrate or zirconyl chloride. The most widely used is zirconyl nitrate. Zirconyl chloride is particularly well suited for obtaining products with the highest specific surfaces.

In the case of the preparation of compositions additionally comprising a doping element, the latter is commonly introduced in the form of a salt, for example in nitrate form. Introduction in the form of a sol is not excluded, when such a type of sol exists.

Mention may particularly be made, as water-soluble cerium compounds, of cerium(IV) salts, such as nitrates or ceric ammonium nitrates for example, which are particularly well suited in this instance. Ceric nitrate is preferably used. It is advantageous to use salts with a purity of at least 99.5 and more particularly of at least 99.9%. The solution of cerium(IV) salts can, without disadvantage, contain cerium in the cerous state but it is desirable for it to contain at least 85% of cerium(IV). An aqueous ceric nitrate solution can, for example, be obtained by reaction of nitric acid with a ceric oxide hydrate prepared conventionally by reaction of a solution of a cerous salt, for example cerous nitrate, and of an aqueous ammonia solution in the presence of hydrogen peroxide. Use can also preferably be made of a ceric nitrate solution obtained according to the process of electrolytic oxidation of a cerous nitrate solution, as described in the document FR-A-2,570,087, which constitutes in this instance an advantageous starting material.

It should be noted here that the aqueous solutions of cerium(IV) salts and of zirconyl salts can exhibit a degree of initial free acidity. According to the present invention, it is just as possible to use an initial solution of cerium(IV) and zirconium salts effectively exhibiting a degree of free acidity as mentioned above as solutions which would have been neutralized beforehand more or less exhaustively. This neutralization can be carried out by addition of a basic compound to the abovementioned mixture, so as to limit this acidity. This basic compound can be, for example, an aqueous ammonia solution or alternatively a solution of alkali metal (sodium, potassium and the like) hydroxides but preferably an aqueous ammonia solution. It is then possible to define in practice a degree of neutralization (r) of the initial cerium and zirconium solution by the following equation:

$$r = \frac{n3 - n2}{n1}$$

in which n1 represents the total number of moles of Ce(IV) and of zirconium present in the solution after neutralization; n2 represents the number of moles of OH⁻ ions effectively necessary to neutralize the initial free acidity introduced by the aqueous cerium(IV) and zirconium salt solutions; and n3 represents the total number of moles of OH⁻ ions introduced by the addition of the base. When the "neutralization" alternative form is implemented, use is made in all cases of an amount of base which absolutely must be less than the amount of base which would be necessary to obtain complete precipitation of the cerium zirconium hydroxide species, this amount depending on the composition synthesized. In practice, the limit is therefore set at degrees of neutralization which do not exceed 2.

The initial mixture thus being obtained, it is then heated in accordance with the second stage of the process according to the invention.

The temperature at which this heat treatment, also known as thermohydrolysis, is carried out is greater than 100° C. It can thus be between 100° C. and the critical temperature of the reaction mixture, in particular between 100 and 350° C. and preferably between 100 and 200° C.

The heating operation can be carried out by introducing the liquid mixture containing the abovementioned species into an enclosed space (closed reactor of the autoclave type), the necessary pressure then resulting only from the heating alone of the reaction mixture (autogenous pressure). Under the temperature conditions given above, and in aqueous media, it is thus possible to specify, by way of illustration, that the pressure in the closed reactor can vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is, of course, also possible to exert an external pressure which is then added to that resulting from the heating.

The heating can also be carried out in an open reactor for temperature in the region of 100° C.

The heating can be carried out either under air or under an inert gas atmosphere, preferably nitrogen.

The duration of the treatment is not critical and can thus vary within wide limits, for example between 1 and 48 hours and preferably between 2 and 24 hours. Likewise, the temperature rise takes place at a rate which is not critical and it is thus possible to reach the set reaction temperature by heating the mixture for example between 30 minutes and 4 hours, these values being given entirely by way of indication.

On conclusion of this second stage, the reaction mixture thus obtained is brought to a basic pH. This operation is carried out by adding a base, such as for example an aqueous ammonia solution, to the mixture.

Basic pH is understood to mean a pH value greater than 7 and preferably greater than 8.

Although this alternative form is not preferred, it is possible to introduce the doping element or elements, in particular in the form which has been described above, into the reaction mixture obtained on conclusion of the heating, in particular at the time of the addition of the base.

On conclusion of the heating stage, a solid precipitate is recovered which can be separated from its mixture by any conventional solid/liquid separation technique, such as, for example, filtration, settling, draining or centrifuging.

The product as recovered can then be subjected to washings, which are then carried out with water or optionally with a basic solution, for example an aqueous ammonia solution. Washing can be carried out by resuspending the precipitate in water and keeping the suspension thus obtained at a temperature which can range up to 100° C. In order to remove the residual water, the washed product can optionally be dried, for example in an oven or by spraying, at a temperature which can vary between 80 and 300° C. and preferably between 100 and 200° C.

According to a specific alternative form of the invention, the process comprises a maturing.

This maturing can be carried out directly on the reaction mixture obtained after addition of a base in order to result in a basic pH. As the addition of a base has the effect of cooling the reaction mixture, the maturing is carried out by reheating the latter. The temperature to which the mixture is heated is at least 40° C., more particularly at least 60° C. and more particularly still at least 100° C. The mixture is thus kept at a constant temperature for a period of time which is commonly at least 30 minutes and more particularly at least 1 hour. The maturing can be carried out at atmospheric pressure or optionally at a higher pressure.

The maturing can also be carried out on a suspension obtained after returning the precipitate to water. The pH of this suspension can be adjusted to a value greater than 7 and preferably greater than 8.

It is possible to carry out a number of maturings. Thus, the precipitate obtained after the maturing stage and optionally a washing can be resuspended in water and then another maturing of the mixture thus obtained can be carried out. This other maturing is carried out under the same conditions as those which have been described for the first. Of course, this operation can be repeated a number of times.

In a final stage of the process according to the invention, the precipitate recovered, optionally after washing and/or drying, can then be calcined. This calcination makes it possible to develop the crystallinity of the solid solution formed and it can also be adjusted and/or chosen according to the subsequent temperature of use intended for the composition according to the invention, while taking into account the fact that the specific surface of the product becomes smaller as the calcination temperature used becomes higher. Such a calcination is generally carried out under air but a calcination carried out, for example, under an inert gas or under a controlled atmosphere (oxidizing or reducing) is very clearly not excluded.

In practice, the calcination temperature is generally limited to a range of values between 300 and 1000° C.

Even after calcinations at high temperatures, that is to say in particular temperatures greater than those which are strictly necessary to clearly demonstrate, by X-rays, the formation of the desired solid solution, the compositions according to the invention retain entirely acceptable specific surfaces.

A calcination can be carried out in two steps. A first calcination can be carried out at a relatively low temperature, for example at 300–400° C., and a second at a higher temperature, for example at 500–800° C. This two-step calcination can be carried out in the same furnace comprising differentiated heating regions.

The second alternative form of the process will now be described.

The first stage of this alternative form consists in preparing a mixture comprising a cerium compound, zirconium oxychloride ($ZrOCl_2$) and a compound of the doping element.

The cerium compound can be a cerium(III) or cerium(IV) compound. The compounds are preferably soluble compounds. That which has been said above with respect to cerium compounds, and in particular cerium(IV) compounds, and compounds of the doping element also applied here. A cerium(IV) compound is preferably used, such a compound resulting in the products with the highest surfaces. The various compounds of the mixture are present in the stoichiometric proportions necessary for obtaining the desired final composition.

In a second stage, the said mixture and a basic compound are brought together. Products of hydroxide or carbonate type can be used as base or basic compound. Mention may be made of alkali metal or alkaline-earth metal hydroxides. Secondary, tertiary or quaternary amines can also be used. However, amines and aqueous ammonia may be preferred, insofar as they decrease the risks of pollution by alkali metal or alkaline-earth metal cations. Mention may also be made of urea. The reactants can be introduced in any order, it being possible for the basic compound to be introduced into the mixture or vice versa or alternatively it being possible for the reactants to be introduced simultaneously into the reactor.

Addition can be carried out in a single step, gradually or continuously and it is preferably carried out with stirring.

This operation can be carried out at a temperature of between room temperature (18–25° C.) and the reflux temperature of the reaction mixture, it being possible for the latter to reach 120° C., for example. It is preferably carried out at room temperature.

It may be noted that it is possible, in particular in the case of a process using a cerium(III) compound, to add an oxidizing agent, such as hydrogen peroxide, either to the starting mixture or during introduction of the basic compound.

At the end of the addition of the basic solution, the reaction mixture can further optionally be kept stirring for a while, in order to bring precipitation to completion.

It is also possible, at this stage of the process, to carry out a maturing. This can be carried out directly on the reaction mixture obtained after addition of the basic compound or on a suspension obtained after returning the precipitate to water. The maturing is carried out by heating the mixture. The temperature to which the mixture is heated is at least 40° C., more particularly at least 60° C. and more particularly still at least 100° C. The mixture is thus maintained at a constant temperature for a period of time which is commonly at least 30 minutes and more particularly at least 1 hour. The maturing can be carried out at atmospheric pressure or optionally at a higher pressure.

On conclusion of the precipitation stage, a large amount of a solid precipitate is recovered which can be separated from its mixture by any conventional technique.

The washing and calcination stages are then carried out in the same way as that described for the first embodiment.

The compositions of the invention as described above or as obtained in the processes mentioned above are provided in the form of powders but they can optionally be shaped in order to be provided in the form of granules, balls, cylinders or honeycombs of variable sizes. These compositions can be applied to any support commonly used in the field of catalysis, that is to say in particular thermally inert supports. This support can be chosen from alumina, titanium oxide, cerium oxide, zirconium oxide, silica, spinels, zeolites, silicates, crystalline silicoaluminium phosphates or crystalline aluminum phosphates. The compositions can also be used in catalytic systems comprising a coating (wash coat), which processes catalytic properties and which is based on these compositions, on a substrate of the metal or ceramic monolith type, for example. The coating can itself also contain a support of the type of those mentioned above. This coating is obtained by mixing the composition with the support, so as to form a suspension which can then be deposited on the substrate.

These catalytic systems and more particularly the compositions of the invention can have a great many applications. They are therefore particularly well suited to, and thus can be used in, the catalysis of various reactions such as, for example, dehydration, hydrosulphurization, hydrodenitrification, desulphurization, hydrodesulphurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation or the shift conversion.

In the case of these uses in catalysis, the compositions of the invention are employed in combination with precious metals. The nature of these metals and the techniques for the incorporation of the latter in these compositions are well known to the person skilled in the art. For example, the metals can be platinum, rhodium, palladium or iridium and they can, in particular, be incorporated in the compositions by impregnation.

Among the uses mentioned, the treatment of exhaust gases from internal combustion engines (automobile afterburning catalysis) is a particularly advantageous application.

For this reason, the invention also relates to the use of a catalytic composition or of a catalytic system as described above in the manufacture of a catalyst for automobile afterburning.

Finally, the compositions of the invention can be used in the preparation of ceramics.

Concrete but non-limiting examples will now be given.

EXAMPLE 1

A zirconyl nitrate (crystalline zirconyl nitrate, Prolabo) solution is added to a cerium(IV) nitrate solution in the respective proportions, by weight of oxide, of 80/20. Aqueous ammonia is added to the mixture of the two solutions, so as to obtain a ratio r, as defined above, of 0.7. The concentration is adjusted to 80 g/l and the solution is then brought to 150° C. for 6 h. After cooling, the pH of the reaction mixture is brought to a value of 8.5 using an ammonia solution. The temperature is then brought to 100° C. The mother liquors are then removed by settling and the equivalent amount of water is added. The reaction mixture is again heated for 1 hour at 100° C. The reaction mixture is filtered under pressure. The cake obtained is calcined for 6 h at 900° C. and for 6 h at 1000° C. The specific surfaces are respectively 36 and 21 $m^2/g$.

EXAMPLE 2

A solution of zirconyl nitrate (obtained by attack of nitric acid on a Zr carbonate) is added to a cerium(IV) nitrate solution in the respective proportions, by weight of oxide, of 80/20 and such that the ratio r is 0.5. The concentration is adjusted to 80 g/l and the solution is then brought to 150° C. for 6 hours. After cooling, the pH of the reaction mixture is brought to a value of 8.5 using an ammonium solution. The temperature is then brought to 100° C. After cooling, the mother liquors are removed by settling and an equivalent amount of water is added. The reaction mixture is again brought to 100° C. After settling, the supernatant is removed and the product is dried by spraying. The powder obtained is calcined for 2 hours at 650° C.

The specific surfaces of the oxide thus obtained are respectively 45 and 25 $m^2/g$ for 6 hours at 900° C. and 1000° C.

X-ray diffraction analysis shows that the oxide obtained is in the form of a pure solid solution phase.

EXAMPLE 3

A zirconyl nitrate solution is added to a Ce(IV) nitrate solution in the respective proportions, by weight of oxide, of 63/37 and such that the ratio r is 0.35. The concentration is adjusted to 80 g/l and the solution is then brought to 150° C. for 6 hours. After cooling, the pH of the mixture is brought to a value of 8.5 using an ammonia solution. The mixture thus obtained is filtered and then calcined for 2 hours at 400° C.

The specific surfaces of the oxide thus obtained are respectively 43 and 20 $m^2/g$ for 6 hours at 900° C. and 1000° C.

X-ray diffraction analysis shows that the oxide obtained is in the form of a pure solid solution phase.

EXAMPLE 4

A solution of zirconyl chloride (obtained by dissolving the crystalline salt) is added to a Ce(IV) nitrate solution in the respective proportions, by weight of oxide, of 80/20 and such that the ratio r is −0.07. The concentration is adjusted to 80 g/l and the solution is then brought to 150° C. for 6 hours. After cooling, the pH of the reaction mixture is brought to a value of 8.5 using an ammonia solution. The temperature is then brought to 100° C. After cooling, the mother liquors are removed by settling and an equivalent amount of water is added. The reaction mixture is again brought to 100° C. After cooling, the product is filtered off.

After calcination for 6 hours at 900° C. and 1000° C., the specific surfaces of the oxides are 40 and 29 $m^2/g$ respectively.

X-ray diffraction analysis shows that the oxide obtained is in the form of a pure solid solution phase.

EXAMPLE 5

The starting solution is composed of a mixture of cerium (IV) nitrate, of zirconyl nitrate and of lanthanum nitrate in respective proportions, by weight of oxide, of 19/76/5 (ratio r=0.5). The preparation is carried out as in Example 2. Calcination of the product is carried out for 2 hours at 600° C.

After calcination for 6 hours at 900° C., 1000° C. and 1100° C., the specific surfaces are 60, 41 and 11 $m^2/g$ respectively.

X-ray diffraction analysis shows that the oxide obtained is in the form of a pure solid solution phase.

EXAMPLE 6

The starting solution is composed of a mixture of cerium (IV) nitrate, of zirconyl nitrate and of praseodymium nitrate in respective proportions, by weight of oxide, of 19/76/5 (r=0.5). The preparation is carried out as in Example 2. Calcination of the product is carried out for 2 hours at 600° C.

After calcination for 6 hours at 900° C. and 1000° C., the specific surfaces are 58 and 33 $m^2/g$ respectively.

X-ray diffraction analysis shows that the oxide obtained is in the form of a pure solid solution phase.

EXAMPLE 7

A zirconyl nitrate and neodymium nitrate solution is added to a Ce(IV) nitrate solution in the respective proportions, by weight of 76/5/19 (ratio r=0.5). The concentration is adjusted to 80 g/l and the solution is then brought to 150° C. for 6 hours. After cooling, the pH of the mixture is brought to a value of 8.5 using an ammonia solution. The mixture thus obtained is filtered and then calcined for 2 hours at 400° C.

The specific surfaces of the oxide thus obtained are respectively 55 and 33 $m^2/g$ for 6 hours at 900° C. and 1000° C.

X-ray diffraction analysis shows that the oxide obtained is in the form of a pure solid solution phase.

EXAMPLE 8

The starting solution is composed of a mixture of cerium (IV) nitrate, of zirconyl nitrate, of lanthanum nitrate and of praseodymium nitrate in respective proportions, by weight of oxide, of 18/72/5/5 (ratio r=0.5). The preparation is carried out as in Example 2. Calcination of the product is carried out for 2 hours at 800° C.

After calcination for 6 hours at 900° C., 1000° C. and 1100° C., the specific surfaces are 64, 49 and 13 $m^2/g$ respectively.

X-ray diffraction analysis shows that the oxide obtained is in the form of a pure solid solution phase.

EXAMPLE 9

A solution of a mixture of Ce(IV) nitrate, of La nitrate and of Zr oxychloride, in respective proportions, by weight of oxide, of 17/5/78, at a concentration of 172 g of oxide/l, is precipitated by addition of this solution to an ammonia solution. After settling the pulp obtained, the mother liquors are removed and an equivalent amount of water is added. The reaction mixture is heated for 1 hour at 100° C. After settling and removing the mother liquors, an equivalent volume of water is again added and the suspension is then filtered. The cake is then calcined for 2 hours at 400° C. and then for 1 hour at 750° C. After calcination for 6 hours at 900° C. and for 6 hours at 1000° C., the specific surfaces are 63 and 51 $m^2/g$ respectively.

X-ray diffraction analysis shows that the oxide obtained is in the form of a pure solid solution phase.

EXAMPLE 10

A zirconyl nitrate (crystalline zirconyl nitrate, Prolabo) solution is added to a cerium(IV) nitrate solution in the respective proportions, by weight of oxide, of 80/20. The concentration is adjusted to 80 g/l and the solution is then brought to 150° C. for 6 h. After cooling, the pH of the reaction mixture is brought to a value of 8.5 using an ammonia solution. The temperature is then brought to 100° C. The mother liquors are then removed by settling and the equivalent amount of water is added. The reaction mixture is again heated for 1 hour at 100° C. The reaction mixture is filtered under pressure. The cake obtained is resuspended in order to be dried by spraying. The product obtained is calcined for 6 h at 900° C. and for 6 hours at 1000° C. The specific surfaces are 32 and 15 $m^2/g$ respectively.

EXAMPLE 11

A solution of a mixture of Ce(III) nitrate and of Zr oxychloride, in respective proportions, by weight of oxide, of 20/80, at a concentration of 172 g of oxide/l, is precipitated by addition of this solution to an ammonia solution containing hydrogen peroxide. After settling the pulp obtained, the mother liquors are removed and an equivalent amount of water is added. The reaction mixture is heated for 1 hour at 100° C. After settling and removing the mother liquors, an equivalent volume of water is again added and the suspension is then filtered. The cake is then calcined for 2 hours at 400° C. After calcination for 6 hours at 900° C. and for 6 hours at 1000° C., the specific surfaces are 35 and 25 $m^2/g$ respectively.

X-ray diffraction analysis shows that the oxide obtained is in the form of a pure solid solution phase.

What is claimed is:

1. A zirconium oxide-based composition comprising cerium oxide, the composition having a specific surface area of at least 30 $m^2/g$ after calcination for 6 hours at 900° C., the composition comprising a solid solution in the form of a single phase defined by zirconium oxide crystallized in a cubic or quadratic system with the cerium oxide dispersed within the crystal lattice of the zirconium oxide, the solid solution being stable such that after calcination for 6 hours at 1000° C. the composition remains in the form a single phase defined by the solid solution.

2. The composition of claim 1, wherein the composition comprises a specific surface area of at least 40 m$^2$/g after calcination for 6 hours at 900° C.

3. The composition of claim 1, wherein the composition comprises a specific surface area greater than 25 m$^2$/g after calcination for 6 hours at 1000° C.

4. The composition of claim 1, wherein the composition has a Zr/Ce oxide atomic ratio equal to or greater than 1.

5. The composition of claim 1, comprising, in oxide form, at least 51% by weight of zirconium oxide and at most 49% by weight of cerium.

6. The composition of claim 1, comprising, in oxide form, at least 55% by weight of zirconium and at most 45% by weight cerium.

7. The composition of claim 1, comprising, in oxide form, at least 65% by weight of zirconium and at most 35% by weight cerium.

8. The composition of claim 1, wherein the composition further comprises, in oxide form, between 0.01 and 25% by weight hafnium.

9. A catalyst comprising, in combination, the composition of claim 1, and a support chosen from the group consisting of: alumina, titanium oxide, cerium oxide, zirconium oxide, silica, a spinel, a zeolite, a silicate, a crystalline silicoaluminum phosphate, and a crystalline aluminum phosphate.

10. A catalytic system comprising, in combination, a coating comprising the composition of claim 1 disposed on a substrate.

11. A method of treating exhaust gases from an internal combustion engine comprising introducing the catalytic system of claim 10 into the combustion occurring within the engine.

12. A zirconium oxide-based composition comprising at least 15% by weight cerium oxide, the composition having a specific surface area of at least 30 m$^2$/g calcination for 6 hours at 900° C., the composition comprising solid solution in the form of a single phase defined by zirconium oxide crystallized in a cubic or quadratic system with the cerium oxide dispersed within the crystal lattice of the zirconium oxide, the solid solution being stable such that after calcination for 6 hours at 1000° C. the composition remains in the form a single phase defined by the solid solution.

13. The composition of claim 12, wherein the composition comprises a specific surface area of at least 40 m$^2$/g after calcination for 6 hours at 900° C.

14. The composition of claim 12, wherein the composition comprises a specific surface area greater than 25 m$^2$/g after calcination for 6 hours at 1000° C.

15. The composition of claim 12, wherein the composition has a Zr/Ce oxide atomic ratio equal to or greater than 1.

16. The composition of claim 12, wherein comprising, in oxide form, at least 51% by weight of zirconium oxide and at most 49% by weight of cerium.

17. The composition of claim 12, wherein comprising, in oxide form, at least 55% by weight of zirconium and at most 45% by weight of cerium.

18. The composition of claim 17, comprising, in oxide form, at least 65% by weight of zirconium and at most 35% by weight of cerium.

19. The composition of claim 12, wherein the composition further comprises, in oxide form, between 0.01 and 25% by weight hafnium.

20. A catalyst comprising, in combination, the composition of claim 12, and a support chosen from the group consisting of: alumina, titanium oxide, cerium oxide, zirconium oxide, silica, a spinel, a zeolite, a silicate, a crystalline silicoaluminum phosphate, and a crystalline aluminum phosphate.

21. A catalytic system comprising, in combination, a coating comprising the composition of claim 12 disposed on a substrate.

22. A method of treating exhaust gases from an internal combustion engine comprising introducing the catalytic system of claim 21 into the combustion occurring within the engine.

23. A zirconium oxide-based composition comprising at least 20% by weight cerium oxide, the composition having a specific surface area of at least 30 m$^2$/g calcination for 6 hours at 900° C., the composition comprising solid solution in the form of a single phase defined by zirconium oxide crystallized in a cubic or quadratic system with the cerium oxide dispersed within the crystal lattice of the zirconium oxide, the solid solution being stable such that after calcination for 6 hours at 1000° C. the composition remains in the form a single phase defined by the solid solution.

24. The composition of claim 23, wherein the composition comprises a specific surface area of at least 40 m$^2$/g after calcination for 6 hours at 900° C.

25. The composition of claim 23, wherein the composition comprises a specific surface area greater than 25 m$^2$/g after calcination for 6 hours at 1000° C.

26. The composition of claim 23, wherein the composition has a Zr/Ce oxide atomic ratio equal to or greater than 1.

27. The composition of claim 23, wherein comprising, in oxide form, at least 51% by weight of zirconium oxide and at most 49% by weight of cerium.

28. The composition of claim 27, wherein comprising, in oxide form, at least 55% by weight of zirconium and at most 45% by weight of cerium.

29. The composition of claim 28, comprising, in oxide form, at least 65% by weight of zirconium and at most 35% by weight of cerium.

30. The composition of claim 23, wherein the composition further comprises, in oxide form, between 0.01 and 25% by weight hafnium.

31. A catalyst comprising, in combination, the composition of claim 23, and a support chosen from the group consisting of: alumina, titanium oxide, cerium oxide, zirconium oxide, silica, a spinel, a zeolite, a silicate, a crystalline silicoaluminum phosphate, and a crystalline aluminum phosphate.

32. A catalytic system comprising, in combination, a coating comprising the composition of claim 23 disposed on a substrate.

33. A method of treating exhaust gases from an internal combustion engine comprising introducing the catalytic system of claim 32 into the combustion occurring within the engine.

34. A zirconium oxide-based composition comprising cerium oxide and a dopant, after calcination for 6 hours at 900° C., the composition comprising solid solution in the form of a single phase defined by zirconium oxide crystallized in a cubic or quadratic system with the cerium oxide dispersed within the crystal lattice of the zirconium oxide, the composition remains stable and in the form of a single phase defined by the solid solution after calcination for 6 hours at 1000° C. and comprise a specific surface area greater than 25m$^2$/g.

35. The composition of claim 34, comprising at least 15% by weight cerium oxide.

36. The composition of claim 34, wherein the dopant comprises an elemental rare-earth metal, of a mixture containing a rare-earth metal.

37. The composition of claim 34, wherein the dopant is chosen from the group consisting of a alkaline-earth metal, aluminum, thorium, scandium, gallium, titanium, niobium, tantalum, or a mixture thereof.

38. The composition of claim 34, wherein the composition has a specific surface area of at least 30 $m^2/g$ after calcination for 6 hours at 1000° C.

39. The composition of claim 34, wherein the composition has a specific surface area of at least 40 $m^2/g$ after calcination for 6 hours at 1000° C.

40. The composition of claim 34, wherein the composition has a specific surface area of at least 50 $m^2/g$ after calcination for 6 hours at 1000° C.

41. The composition of claim 34, wherein the composition has a specific surface area of at least 60 $m^2/g$ after calcination for 6 hours at 1000° C.

42. The composition of claim 34, wherein the dopant comprises lanthanum, and the composition has a specific surface area of at least 5 $m^2/g$ after calcination for 6 hours at 1100° C.

43. The composition of claim 42, wherein the composition has a specific surface area of at least 10 $m^2/g$ after calcination for 6 hours at 1100° C.

44. The composition of claim 34, wherein the composition has a Zr/Ce oxide atomic ratio equal to or greater than 1.

45. The composition of claim 34, wherein comprising, in oxide form, at least 51% by weight of zirconium oxide and at most 49% by weight of cerium.

46. The composition of claim 45, wherein comprising, in oxide form, at least 55% by weight of zirconium and at most 45% by weight cerium.

47. The composition of claim 46, comprising, in oxide form, at least 65% by weight of zirconium and at most 35% by weight of cerium.

48. The composition of claim 34, comprising, in the form of an oxide, 0.1 to 25% by weight of the dopant.

49. The composition of claim 34, wherein the composition further comprises, in oxide form, between 0.01 and 25% by weight hafnium.

50. A catalyst comprising, in combination, the composition of claim 34, and a support chosen from the group consisting of: alumina, titanium oxide, cerium oxide, zirconium oxide, silica, a spinel, a zeolite, a silicate, a crystalline silicoaluminum phosphate, and a crystalline aluminum phosphate.

51. A catalytic system comprising, in combination, a coating comprising the composition of claim 34 disposed on a substrate.

52. A method of treating exhaust gases from an internal combustion engine comprising introducing the catalytic system of claim 51 into the combustion occurring within the engine.

53. A zirconium oxide-based composition comprising cerium oxide and 1 to 10% by weight of a dopant, the composition comprising a solid solution in the form of a single phase defined by zirconium oxide crystallized in a cubic or quadratic system with the cerium oxide dispersed within the crystal lattice of the zirconium oxide after calcination for 6 hours at 900° C., the composition remains in the form a single phase defined by the solid solution after calcination for 6 hours at 1000° C. and comprises a specific surface area of at least 25 $m^2/g$.

54. The composition of claim 53, comprising at least 15% by weight cerium oxide.

55. The composition of claim 53, wherein the dopant comprises an elemental rare-earth metal, or a mixture containing a rare-earth metal.

56. The composition of claim 53, wherein the dopant is chosen from the group consisting of an alkaline-earth metal, aluminum, thorium, scandium, gallium, titanium, niobium, tantalum, or a mixture thereof.

57. The composition of claim 53, wherein the composition has a specific surface area of at least 30 $m^2/g$ after calcination for 6 hours at 1000° C.

58. The composition of claim 53, wherein the composition has a specific surface area of at least 40 $m^2/g$ after calcination for 6 hours at 1000° C.

59. The composition of claim 53, wherein the composition has a specific surface area of at least 50 $m^2/g$ after calcination for 6 hours at 900° C.

60. The composition of claim 53, wherein the composition has a specific surface area of at least 60 $m^2/g$ after calcination for 6 hours at 1000° C.

61. The composition of claim 53, wherein the dopant comprises lanthanum, and the composition has a specific surface area of at least 5 $m^2/g$ after calcination for 6 hours at 1100° C.

62. The composition of claim 61, wherein the composition has a specific surface area of at least 10 $m^2/g$ after calcination for 6 hours at 1100° C.

63. The composition of claim 53, wherein the composition has a Zr/Ce oxide atomic ratio equal to or greater than 1.

64. The composition of claim 53, comprising, in oxide form, at least 51% by weight of zirconium oxide and at most 49% by weight of cerium.

65. The composition of claim 64, wherein comprising, in oxide form, at least 55% by weight of zirconium and at most 45% by weight cerium.

66. The composition of claim 65, comprising, in oxide form, at least 65% by weight of zirconium and at most 35% by weight of cerium.

67. The composition of claim 53, comprising, in the form of an oxide, 0.1 to 25% by weight of the dopant.

68. The composition of claim 53, wherein the composition further comprises, in oxide form, between 0.01 and 25% by weight hafnium.

69. A catalyst comprising, in combination, the composition of claim 53, and a support chosen from the group consisting of: alumina, titanium oxide, cerium oxide, zirconium oxide, silica, a spinel, a zeolite, a silicate, a crystalline silicoaluminum phosphate, and a crystalline aluminum phosphate.

70. A catalytic system comprising, in combination, a coating comprising the composition of claim 53 disposed on a substrate.

71. A method of treating exhaust gases from an internal combustion engine comprising introducing the catalytic system of claim 70 into the combustion occurring within the engine.

72. A stable zirconium oxide based composition comprising cerium oxide, wherein:
    after calcining the composition for 6 hours at 900° C., the composition is in a form in which the cerium oxide is in solid solution with a single cubic or quadratic zirconium oxide phase, and has a specific surface area of at least 30 $m^2/g$; and
    after calcining the composition for 6 hours at 1,000° C., the composition remains in the form in which the cerium oxide is in solid solution with the single cubic or quadratic zirconium oxide phase, and has a specific surface area of at least 25 $m^2/g$.

73. A stable zirconium oxide based composition comprising cerium oxide, and at least one dopant, wherein:

after calcining the composition for 6 hours at 900° C., the composition is in a form in which the cerium oxide is in solid solution with a single cubic or quadratic zirconium oxide phase, and has a specific surface area of at least 50 m²/g; and after calcining the composition for 6 hours at 1,000° C., the composition remains in the form in which the cerium oxide is in solid solution with the single cubic or quadratic zirconium oxide phase, and has a specific surface area of at least 30 m²/g.

74. The composition of claim 73, wherein the dopant comprises an elemental rare-earth metal, or a mixture containing a rare-earth metal.

75. The composition of claim 73, wherein the dopant is chosen from the group consisting of an alkaline-earth metal, aluminum, thorium, scandium, gallium, titanium, niobium, tantalum, or a mixture thereof.

76. A method of preparing a zirconium oxide-based composition comprising cerium oxide, the composition having a specific surface area of at least 30 m²/g after calcination for 6 hours at 900° C., the composition comprising a single phase of the cerium oxide in solid solution with the zirconium oxide, the method comprising the steps of:

a) preparing a mixture in a liquid medium containing a zirconium compound and a cerium IV compound;

b) heating the mixture to a temperature greater than 100° C. to form a reaction mixture;

c) bringing the reaction mixture to a basic pH upon conclusion of heating in step b);

d) obtaining a precipitate from the reaction mixture;

e) returning the precipitate to the liquid medium to form a suspension and adjusting the pH of the suspension to a value greater than 8;

f) maturing the suspension by heating to a temperature of at least 100° C.;

g) recovering the precipitate obtained after maturing; and h) calcining the precipitate.

77. The method of claim 76, wherein step a) further comprises adding a dopant to the mixture.

78. The method of claim 76, further comprising adding a dopant to the reaction mixture.

79. The method of claim 76, wherein the zirconium compound added in step a) is zirconyl nitrate or zirconyl chloride, and the cerium compound added in step a) is cerium nitrate or cerium ammonium nitrate.

80. The method of claim 76, wherein step a) further comprises the addition of a basic compound to the mixture to limit the free acidity thereof.

81. A method of preparing a zirconium oxide-based composition comprising cerium oxide, the composition having a specific surface area of at least 30 m²/g after calcination for 6 hours at 900° C., the composition comprising a single phase of the cerium oxide in solid solution with the zirconium oxide, the method comprising the steps of:

a) preparing a mixture in a liquid medium containing a cerium compound and a zirconium oxychloride;

b) combining the mixture with a basic compound to form a reaction mixture c) obtaining a precipitate from the reaction mixture;

d) returning the precipitate to the liquid medium to form a suspension;

e) maturing the suspension by heating to a temperature of at least 100° C.;

f) recovering the precipitate obtained after maturing; and g) calcining the precipitate.

82. The method of claim 81, wherein step a) further comprises the addition of a dopant compound to the mixture.

83. The method of claim 81, wherein the cerium compound of step a) is a cerium IV compound.

84. The method of claim 81, wherein the cerium compound of step a) is a cerium nitrate or a cerium ammonium nitrate.

* * * * *